US011017682B2

(12) United States Patent
Wu et al.

(10) Patent No.: US 11,017,682 B2
(45) Date of Patent: May 25, 2021

(54) GENERATING CUSTOMIZED LEARNING PATHS

(71) Applicant: Microsoft Technology Licensing, LLC, Redmond, WA (US)

(72) Inventors: Pan Wu, Sunnyvale, CA (US); Daniel Patrick Tweed-Kent, San Francisco, CA (US); Sally Limb, San Francisco, CA (US); Marshall David Miller, San Francisco, CA (US); Yiying Cheng, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 266 days.

(21) Appl. No.: 16/001,198

(22) Filed: Jun. 6, 2018

(65) Prior Publication Data
US 2019/0378426 A1    Dec. 12, 2019

(51) Int. Cl.
*G09B 5/00*    (2006.01)
*G09B 7/00*    (2006.01)

(52) U.S. Cl.
CPC .............. *G09B 5/00* (2013.01); *G09B 7/00* (2013.01)

(58) Field of Classification Search
None
See application file for complete search history.

(56) References Cited

U.S. PATENT DOCUMENTS

| 2010/0041007 | A1* | 2/2010 | Wang | G09B 7/00 434/322 |
| 2011/0039249 | A1* | 2/2011 | Packard | G09B 7/08 434/362 |
| 2014/0356846 | A1* | 12/2014 | Su | G06N 5/043 434/362 |
| 2016/0019802 | A1* | 1/2016 | Won | G09B 7/00 434/353 |
| 2016/0155346 | A1* | 6/2016 | Wang | G06N 5/04 434/353 |
| 2016/0358494 | A1* | 12/2016 | Bilic | G09B 5/02 |
| 2018/0096619 | A1* | 4/2018 | Fuka | G09B 7/00 |

\* cited by examiner

*Primary Examiner* — Jason T Yen
(74) *Attorney, Agent, or Firm* — Hickman Becker Bingham Ledesma LLP

(57) ABSTRACT

Techniques for generating customized learning paths are provided. In one technique, consumption data that indicates consumption of multiple learning resources by multiple users is recorded. Based on the consumption data, multiple learning resource tuples are generated, each learning resource tuple indicating that one learning resource that was consumed by a user prior to another learning resource that was consumed by the user. Multiple aggregations are performed, where each aggregation involves aggregating different sets of learning resource tuples, where each set of learning resource tuples comprises the same two learning resources in the same order. Based on a subset of the aggregations, a customized learning path that comprises a set of learning resources is generated for a particular user. The customized learning path is presented to the particular user.

20 Claims, 8 Drawing Sheets

GENERATING CUSTOMIZED LEARNING PATHS

CROSS-REFERENCE TO RELATED APPLICATION

This application is related to U.S. patent application Ser. No. 15/970,754, filed May 3, 2018, the entire contents of which is hereby incorporated by reference as if fully set forth herein.

TECHNICAL FIELD

The present disclosure relates to online resource consumption and, more particularly, to generating customized learning paths of online resources based on analysis of past consumption of those online resources.

BACKGROUND

The modern economy is a "knowledge economy," which requires an educated workforce. Learning is an essential activity for preparing students and non-students alike to become competent in their chosen fields of study. Traditional methods of learning include a classroom headed by a teacher or professor that dictates what the curriculum will be. Typically, in person attendance has been required, though some classrooms are "open" in that some learners can participate in the classroom setting while remote.

However, the traditional classroom model has proven, in many cases, to be slow in adapting to the constant technological advancements in almost every field of human study. Accordingly, many learning resources are moving "online," such that any user with an Internet connection and an Internet-enabled device can access the learning resources. Some learning resources are restricted to students or are behind a paywall, while other learning resources are accessible to all.

Now that there are many (e.g., thousands or tens of thousands) of online learning resources, one challenge for end-users is to select the learning resources that are most appropriate for them. Navigating through a vast library of online resources to find the right content can be time consuming. Furthermore, a user might fail to notice multiple online resources that are highly relevant for advancement towards the user's career goals.

There are two approaches to improve discovery of learning resources and facilitate engagement. One approach is through a recommendation that focuses on recommending a single learning resource to a user. However, this approach is primarily for a casual learner. Because there is no structure or order related with the recommended resources, the user will benefit from only discovering one learning resource. This approach does not provide a long-term learning strategy.

Another approach is a manually-curated learning path. However, such a learning path is only applicable for users who are just getting started in the corresponding subject matter area (e.g., becoming a java developer). This learning path is generic and not customized for the individual. Presenting such a learning path to end-users would likely result in low engagement. Additionally, composing manually-curated learning paths takes a significant amount of time.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for generating customized learning paths are provided. A customized learning path is individualized (and, thus, highly relevant) for each user. In one technique, a customized learning map is generated that comprises multiple learning paths. A customized learning map allows a user to choose his/her own learning path, which enables greater flexibility for the user's preference. Also, a customized learning map might not only provide a single starting learning resource as a recommendation, but a holistic map about which learning resources are good to get started. This information enables the learning experience to be a life-long learning experience, rather than a one-shot approach.

A customized learning path provides meaningful information for a user so that the user is not required to peruse the entire learning resource library to find applicable learning resources. Instead, presuming that other (e.g., similar) users have already explored the best learning paths, the online consumption of learning resources by those other users is leveraged to generate an appropriate learning path of the user.

Example System

Figure 1:
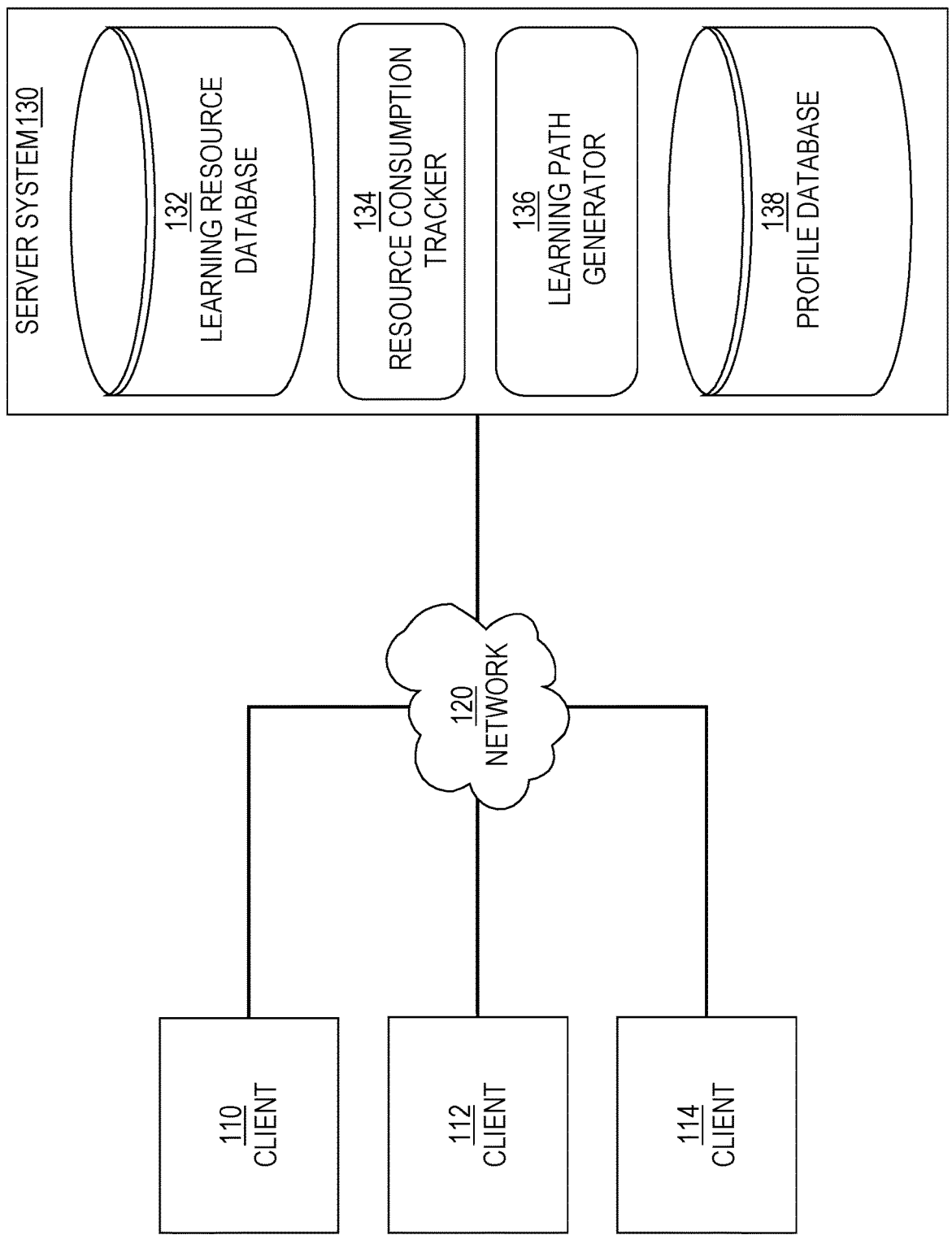
FIG. 1 is a block diagram that depicts an example system for generating customized learning paths, in an embodiment.

FIG. 1 is a block diagram that depicts an example system 100 for generating customized learning paths, in an embodiment. System 100 includes clients 110-114, a network 120, and a server system 130. Although only three clients are depicted, system 100 may be able to support many clients that interact with server system 130 over network 120.

Each of clients 110-114 is an application or computing device that is configured to communicate with server system 130 over network 120. Examples of computing devices include a laptop computer, a tablet computer, a smartphone, a desktop computer, and a Personal Digital Assistant (PDA). An example of an application includes a dedicated application that is installed and executed on a local computing device and that is configured to communicate with server system 130 over network 120. Another example of an application is a web application that is downloaded from server system 130 and that executes within a web browser executing on a computing device. Client 110 may be implemented in hardware, software, or a combination of hardware and software.

Network 120 may be implemented on any medium or mechanism that provides for the exchange of data between client 110 and server system 130. Examples of network 120 include, without limitation, a network such as a Local Area Network (LAN), Wide Area Network (WAN), Ethernet or the Internet, or one or more terrestrial, satellite or wireless links.

Server System

As depicted in FIG. 1, server system 130 includes comprises a learning resource database 132, a resource consumption tracker 134, a learning path generator 136, and a profile database 138. Each of resource consumption tracker 134 and learning path generator 136 may be implemented in hardware, software, or a combination of hardware and software.

Learning resource database 132 comprises multiple learning resources that clients 110-114 may request from server system 130 over network 120. Examples of types of learning resources include a video file (or simply "a video"), an audio file, and a document that comprises text, images, and/or graphics. Thus, a user "consuming" a learning resource may involve the user viewing playback of a video on a screen of the user's computing device, the user listening to an audio playback of an audio file through speakers on the user's computing device, or reading text or images that are part of a document (e.g., a text file, a Word document file, a web page, etc.). Even though one cannot guarantee that a user actually watched a video, listened to an audio file, or read a document, it is presumed that a user consumed a learning resource if the learning resource was delivered to a computing device of the user, which delivery may be confirmed by one or more messages from the computing device after content of the learning resource was transmitted to the learning device.

Learning resource database 132 may be stored on one or more persistent storage devices. A learning resource may be read into volatile memory in response to a client request for the learning resource and transmitted (e.g., streamed) over network 120 to the requesting client. Alternatively, some learning resources, such as relatively popular learning resources, may be read into volatile memory (or retained therein) in anticipation of future client requests for the learning resources.

Resource consumption tracker 134 tracks which learning resources are consumed by each user of multiple users. Resource consumption tracker 134 may storing tracking information on the same set of one or more storage devices that store learning resource database 132.

Tracking may be performed in multiple ways. For example, each user is associated with a resource consumption record (or just "consumption record") that indicates which learning resources the corresponding user consumed and an order in which the learning resources were consumed. When a user consumes a learning resource, resource consumption tracker 134 stores, in a consumption record associated with the user or user's account, an identifier for the learning resource. A consumption record may also include a timestamp that indicates a date and/or time in which each learning resource was consumed. As another example, each learning resource is associated with a consumption record that indicates which users consumed the corresponding learning resource and, for each user, a timestamp that indicates a date and/or time in which that learning resource was consumed by that user.

In a related embodiment, consumption records are grouped according to one or more criteria. For example, consumption records may be grouped based on one or more attributes that are shared in common by a set of users (where each consumption record is associated with a single user), such as consumption records of users who live in CA and who have a job title (e.g., "Software Engineer") in a defined set of job titles (which may include many job titles that are related). As another example, consumption records may be grouped based on one or more attributes that are shared in common by a set of learning resources (where each consumption record is associated with a single learning resource), such as learning resources pertaining to software programming or learning resources pertaining to marketing. Grouping consumption records in this way allows for faster (e.g., on-demand) generation of one or more customized learning paths.

In an embodiment, profile database 138 comprises multiple user profiles, each provided by a different user. In this embodiment, server system 130 maintains accounts for multiple users. Server system 130 may provide a web service, such as a social networking service. Examples of a social networking service include Facebook, LinkedIn, and Google+. Although depicted as a single element, server system 130 may comprise multiple computing elements and devices, connected in a local network or distributed regionally or globally across many networks, such as the Internet. Thus, server system 130 may comprise multiple computing elements other than resource consumption tracker 134 and learning path generator 136.

Profile

In an embodiment, a user's profile includes one or more of the following types of data: first name, last name, email address, residence information, mailing address, phone number, list of one or more educational institutions attended, list of one or more current and/or previous employers, list of one or more current and/or previous job titles, list of skills, list of endorsements, and/or names or identities of friends, contacts, connections of the user, and derived data that is based on online actions that the corresponding user has taken. Examples of such actions include jobs to which the user has applied, views of job postings, views of company pages, views of other users' online profiles, private messages between the user and other users in the user's social network, and public messages that the user posted and that are visible to users outside of the user's social network.

Some data within a user's profile (e.g., work history) may be provided by the user while other data within the user's profile (e.g., endorsement) may be provided by a third party, while other data within the user's profile (e.g., skills) may be provided by the user and a third party, such as a "friend" or connection of the user or a colleague of the user.

Server system 130 may prompt users to provide profile information in one of a number of ways. For example, server system 130 may have provided a web page with a text field for one or more of the above-referenced types of information. In response to receiving profile information from a user's device, server system 130 stores the information in an account that is associated with the user and that is associated with credential data that is used to authenticate the user to server system 130 when the user attempts to log into server system 130 at a later time. Each text string provided by a user may be stored in association with the field into which the text string was entered. For example, if a user enters "Sales Manager" in a job title field, then "Sales Manager" is stored in association with type data that indicates that "Sales Manager" is a job title. As another example, if a user enters "Java programming" in a skills field, then "Java programming" is stored in association with type data that indicates that "Java programming" is a skill.

In an embodiment, server system 130 stores access data in association with a user's account. Access data indicates which users, groups, or devices can access or view the user's profile or portions thereof. For example, first access data for a user's profile indicates that only the user's connections can view the user's personal interests, second access data indicates that confirmed recruiters can view the user's work history, and third access data indicates that anyone can view the user's endorsements and skills.

In an embodiment, some information in a user profile is determined automatically by server system 130 (or another automatic process). For example, a user specifies, in his/her profile, a name of the user's employer. Server system 130 determines, based on the name, where the employer and/or user is located. If the employer has multiple offices, then a location of the user may be inferred based on an IP address associated with the user when the user registered with a social network service (e.g., provided by server system 130) and/or when the user last logged onto the social network service.

Generating Learning Paths

Figure 2:
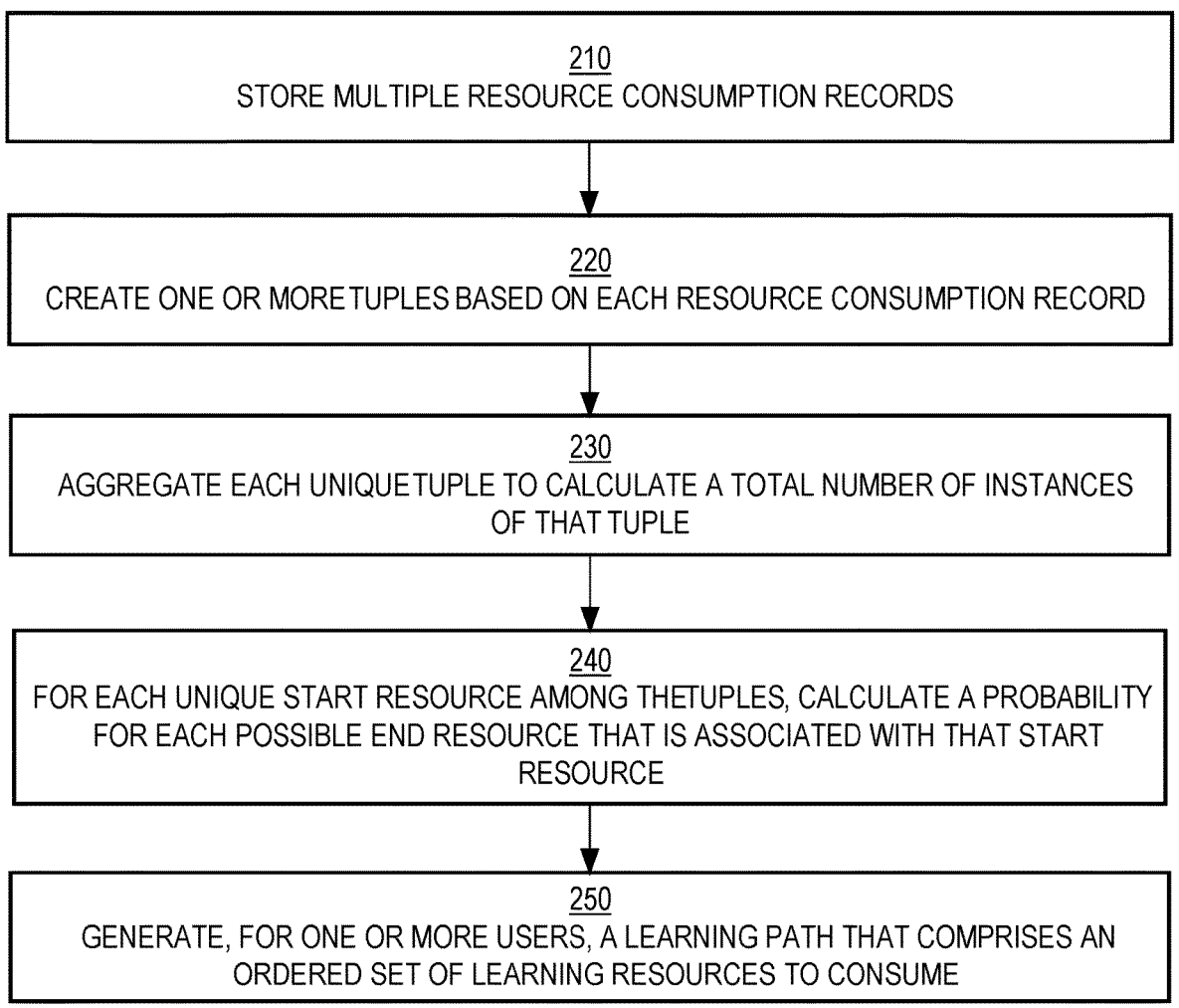
FIG. 2 is a flow diagram that depicts an example process for generating customized learning paths, in an embodiment.

FIG. 2 is a flow diagram that depicts an example process 200 for generating learning paths, in an embodiment. Process 200 may be implemented, at least partially, by resource consumption tracker 134 and a learning path generator 136.

At block 210, multiple resource consumption records are stored, where each resource consumption record associates a user with multiple learning resources that the user has consumed.

At block 220, for each consumption record, one or more tuples are created. A tuple is an ordered pair, such as {resource A, resource B}, where resource A was consumed prior to resource B. The first resource indicated in a tuple (i.e., resource A in this example) is referred to as the "start resource" and the second resource indicated in the tuple (i.e., resource B in this example) is referred to as the "end resource."

Multiple tuples may be created based on a single consumption record. For example, if a resource consumption record indicates three learning resources (R1, R2, R3), then two tuples may be created: {R1, R2} and {R2, R3}. Different users may be associated with different consumption records. Thus, after block 220, multiple tuples are created, some tuples from some users and other tuples from other users.

As explained in more detail below, block 220 may involve creating tuples from a subset of all consumption records. The subset may be defined as consumption records that relate to a certain set of learning resources, consumption activity of a certain set of users (e.g., users that are deemed similar to (or online social connections of) a particular user for which a learning graph is being generated), or learning resources that a particular user has already consumed, that has been consumed by other users, and any learning resources that were consumed (by other users) subsequent to the learning resources that the particular user has already consumed. Thus, not all consumption records are necessarily examined for tuples during block 220.

At block 230, each unique tuple is aggregated to calculate a total for that tuple. For example, after aggregating on unique tuples, a total of 94 {R1, R2} tuples is determined, at total of 63 {R2, R3} tuples is determined, and a total of 27 {R1, R4} tuples is determined.

At block 240, for each unique start resource among the tuples, a probability or likelihood is calculated for each possible end resource that is associated with the start resource in a tuple. For example, if there are a total of 94 {R1, R2} tuples and 27 {R1, R4} tuples (and there are no other tuples that indicate R1 as the beginning resource), then the probability of the end resource being R2 is 94/(94+27) (or ~78%) and the probability of the end resource being R4 is 27/(94+27) (or ~22%). This suggests that the natural order is to consume R2 (instead of R4) after consuming R1.

Block 240 would also involve calculating a probability or likelihood for each possible end resource that is associated with R2, which may be a start resource in a number of tuples. For example, if there are 63 {R2, R3} tuples, 38 {R2, R5} tuples, and 12 {R2, R6} tuples, then the probability of the end resource being R3 is 63/(63+38+12) (or ~56%), the probability of the end resource being R5 is 38/(63+38+12) (or ~34%), and the probability of the end resource being R6 is 12/(63+38+12) (or ~11%).

At block 250, for one or more users that have consumed a particular learning resource, a learning path is generated that suggests an ordered set of resources to consume. For example, if a user has consumed R1, then a suggested learning path for the user may indicate R2 as the next resource to consume, followed by R3.

In a related embodiment, a learning "tree" is generated that comprises multiple learning paths that comprise different sub-paths (or sections) but that may share common sub-paths (or sections). A learning tree (and a learning path) is a directed graph. A learning tree may comprise many different start resources ("roots") and many different end resources ("leaves"). A first node is said to be a "parent" of a second node if the first node points to the second node in the learning tree, indicating that at least some users have consumed the learning resource corresponding to the first node prior to the learning resource corresponding to the second node. Conversely, the second node in this example is a "child" of the first node.

A learning tree may have "loops" where a first resource points to (or is linked with) a second resource that preceded the first resource in the same learning path. This is referred to as "reversion" and is described in more detail below.

A learning tree may be generated based on tuples generated from all consumption activity or with respect to only a subset of consumption activity, such as consumption activity pertaining to a certain set of users/consumers or consumption activity pertaining to a certain set of learning resources. For example, learning resources may be classified as belonging to one of multiple pre-defined groups, such as information technology, finance, marketing, construction, graphic design. Classification of a learning resource may be based on metadata of the learning resource that identifies a particular group/class, such as metadata that is specified by an author or creator of the learning resource or metadata that is specified by non-author, such as an administrator of server system 130. Alternatively, classification (or assigning to a particular group/class) may be accomplished automatically by analyzing metadata (e.g., title, description) and/or content of a learning resource to identify keywords. A machine-learned or rule-based model may perform the classification based on the keywords. By grouping learning resources in this way, learning resources that are likely irrelevant to a user are ignored when generating a customized learning path for the user.

If a learning tree with multiple root nodes is generated as a result of process 200, then one of the root nodes may be selected for a particular user based on one or more selection criteria. The selection criteria may be based on a number of users who have consumed each learning resource corresponding to one of the root nodes. For example, if more users consumed a particular learning resource corresponding to one of the root nodes than any of the other learning resources corresponding to the other root nodes, then the particular learning resource is selected as the beginning node in a learning path. The selection criteria may be based on which learning resources a particular user has already consumed. For example, if the particular user already consumed a non-root learning resource that is connected to a strict subset of the root nodes, then the only the root nodes in the strict subset are considered for the beginning node in a learning path for the particular user. Alternatively, the already consumed learning resource dictates which of the learning resources (that the consumed learning resource "point to" in the learning tree) will be considered as the beginning node in a learning path for the particular user.

In some scenarios, a learning tree might have a single root node, but the single root node is not selected to be included in a learning path for a particular user. For example, if the particular user has already consumed a particular learning resource indicated in the learning tree, then one of the learning resources that the particular learning resource "points to" in the learning tree will be selected as the beginning node in a learning path for the particular user. As another example, in cases where the particular user has not consumed any learning resource indicated in a learning tree, a non-root is selected over the root node because relatively few users have consumed the root node. For example, less than ten users have consumed the learning resource corresponding to the root node while over one hundred users have consumed a learning resource corresponding to a "child node" of the root node.

Similar Users

In an embodiment, a suggested learning path for a particular user is generated based on learning resource consumption by multiple users that are considered similar to the particular user. Thus, if a first user consumes learning resource A and then learning resource B, but the first user is not considered similar to a second user, then the fact that the first user consumed learning resources A and B is ignored when generating a suggested learning path for the second user.

In an embodiment, tuples generated from consumption activity of a group of users are aggregated after determining that a particular user is similar to that group of users who share one or more attributes in common. For example, the particular group may have a certain common job title (or a job title that is in a particular group of job titles), be in a certain job function, be in a certain job industry, have a certain level of experience (e.g., at least 4 years in a certain industry), live or work in a certain geographic region (e.g., United States or South America), and/or have a certain number of connections in a social network. If the particular user is associated with the one or more attributes of the group, then a customized learning path for the particular user is generated based on tuples that are generated from consumption activity of users in that group.

In a related embodiment, tuples generated from consumption activity of a group of users are aggregated prior to determining that a particular user is similar to that group of users. Thus, the aggregation is performed in anticipation that one or more users who are similar to the group of users will be detected. Thus, prior to any request for a customized learning path, resource consumption analyzer 126 may group users based on one or more criteria and aggregate tuples accordingly.

In both embodiments (aggregation of tuples occurring either before or after a particular user is associated with a group of users), the particular user may have recently registered with server system 130 and may have not consumed any learning resource available through server system 130. Thus, the particular user may not be associated with any start resource. However, similar users will be associated with a start resource, from which a learning path may be generated for the particular user. In the scenario where the particular user has consumed a learning resource, the identity of that consumed learning resource may be used to identify a starting point in a learning tree comprising many different learning paths.

A determination that two users are similar (or that a user is similar to a group of users) may be performed based on one or more profiles stored in profile database 138. For example, one or more attribute values from a user's profile stored in profile database 138 is determined. The one or more attribute values are compared to one or more target attribute values (or group profile) of a group of users. Such a group profile may be stored separate from any profile in profile database 138. As another example, a user is considered similar to a group of users if the user has a match score with respect to a group profile above a certain threshold, such as a number of common attribute values or a weighted match where some matching attribute values (e.g., job function and level of experience) are weighted higher than other matching attribute values (e.g., geographic region).

Learning Path Ending Criteria

In an embodiment, one or more ending criteria are used to determine the length of a learning path, where the "length" of a learning path is the number of learning resources in the learning path. One example ending criterion is a learning path that contains at least three learning resources. Thus, once learning path generator 136 follows two edges of a learning tree from a beginning point in the learning tree, then learning path generator 136 stops and causes the three learning resources to be displayed as a suggested learning path for the corresponding user.

Alternatively, after identifying a threshold number of learning resources (e.g., three) for a candidate learning path, learning path generator 136 may then determine whether one or more other ending criteria are satisfied before adding another learning resource to the candidate learning path. If the one or more other ending criteria are not satisfied, then another learning resource is identified and added to the candidate learning path. This process may repeat until the one or more other ending criteria are satisfied. In a related embodiment, different ending criteria may be considered after an addition of one or more learning resources to a learning path. For example, after three learning resources are identified for a candidate learning path, a first set of ending criteria is considered. After a fourth learning resource is identified and added to the candidate learning path, a second set of ending criteria is considered. After a fifth and sixth learning resources are identified and added to the candidate learning path, a third set of ending criteria is considered.

Aggregation Frequency

In an embodiment, the same set of consumption records may be analyzed multiple times. For example, a learning path (or the tuples from which the learning path is generated) may be generated on a regular basis, such as daily, weekly, monthly. As another example, a learning path is generated on demand, such as in response to a user requesting a learning path or in response to a system making a certain determination about the user, such as the user being new, the user consuming a particular resource recently, the user performing some other online action, or the passage of an amount of time since the user last received or was notified about a learning path. Both approaches allow for (a) any newly created consumption records and/or (b) any updates to existing consumption records to be considered when generating a learning path.

For example, in response to determining that a particular user has just consumed R1, any or all consumption records associated with R1 are retrieved to determine which users consumed R1, zero or more of those users are ignored (e.g., because they are not determined to be similar to the particular user), and the remaining users subsequent consumption activity (reflected in consumption records associated with the remaining users) is analyzed to generate first tuples where R1 is the start resource, second tuples where the end resources in the first tuples are the start tuples in the second tuples, and so forth. A portion of process 200 described above for generating a learning path may be implemented relative to these newly generated tuples.

Level of Consumption

In an embodiment, recording the fact that a user consumed a learning resource does not require that the user consume the entirety of the learning resource. For example, some users may stop watching a video when 10 seconds of the video are remaining. Nevertheless, a record is kept that indicates that those users consumed (or watched) the video.

In a related embodiment, in order for a learning resource to be considered a consumed learning resource for purposes of creating tuples, a user must consume a threshold amount of the learning resource, such as at least 80%. A threshold amount may be the same across all learning resources, across only some learning resources while other learning resources are associated with different threshold amounts, or for certain users while other users may be associated with a different threshold amount. For example, learning resource A may be associated with a 60% threshold and learning resource B may be associated with a 85% threshold. As another example, one class or group of users is associated with a 55% threshold and another class or group of users is associated with a 75% threshold.

In a related embodiment, in order for a learning resource to be considered a consumed learning resource for purposes of creating tuples, a user must consume a certain segment the learning resource. For example, a video may be ten minutes long and the second and third minutes contain the most important information. Such a determination may be reflected in a written transcript of the video, which transcript may be provided by the author, creator, or provider of the video, or may be reflected in metadata that accompanies the video. Different learning resources may have different "required segments."

Also, a learning resource may have multiple required segments that a user must consume in order to associate the learning resource with the user (or vice versa). For example, segment 2:19 to 3:45 and segment 18:51 to 23:44 of a video must be viewed by a user in order to be considered consumed by that user.

In a related embodiment, one or more learning resources are associated with both an amount threshold (e.g., a percentage) and a segment requirement. Again, different learning resources may be associated with different amount thresholds and different segment requirements.

Recording how much a user consumes a learning resource may vary from resource type to resource type and from implementation to implementation. For example, if a learning resource is a document of multiple pages and a user must be presented at least page 3 for more than two minutes, then a web browser or web application that displays the document reports to server system 130 (or, e.g., resource consumption tracker 134) which page of the document the user has requested and a timestamp of each request pertaining to the document. For example, a web browser reports that a user requested page 3 at time X and that the user requested page 4 at time Y. Server system 130 determines whether the difference between time Y and time X is at least two minutes. If so, then resource consumption tracker 134 records that the user consumed the document.

As another example, a learning resource is an audio file and a user must listen to at least 90% of the audio file in order to be considered a consumption of that audio file by that user. An audio player executing in a web browser or a web application reports to server system 130 where a user begins playback of the audio file, where the user pauses playback of the audio file, and, optionally, where the user skips or fast forwards. In some implementations, the audio player treats skips and fast forwards as (a) pauses where the playback begins to skip or fast forward and (b) subsequent resumptions where the skipping or the fast forwarding ends. Times between playback starts and playback pauses are considered (e.g., by resource consumption tracker 134) part of the audio file that is consumed by a user, while times between playback pauses and playback starts are not considered part of the audio file that is consumed by the user.

As another example, a learning resource is a video and a user must watch at least 75% of the video and watch at least the first four minutes to be considered a consumption of that audio file by that user. A video player executing in a web browser or a web application reports to server system 130 where a user begins playback of the video, where the user pauses playback of the video, and, optionally, where the user skips or fast forwards through the video. Times between video playback starts and playback pauses are considered part of the video that is consumed by a user, while times between playback pauses and playback starts are not considered part of the video that is consumed by the user.

Weighting Tuples Based on Level of Consumption

In an embodiment, some tuples (or items within tuples) are weighted more than other tuples (or items within tuples) based on level of consumption. For example, a user watched 80% of R1 and then watched 27% of R2. A first resource consumption record for the user may indicate the two percentages along with the two resources. When creating a tuple based on the first resource consumption record, R1 may be weighted with a 80% and R2 may be weighted with a 27%, such as {0.8R1, 0.27R2}. If a second resource consumption record indicates 100% for both R1 and R2 (and R2 is watched after R1), then combining (e.g., aggregating) the above tuple with a tuple from the second resource consumption record may indicate {1.8R1, 1.27R2}.

In a related embodiment, if a learning resource is consumed less than a certain amount (e.g., less than five minutes or less than a certain percentage (e.g., 30%)), then a negative weighting is applied to a tuple for the learning resource. Thus, when combining tuples, instead of adding two positive values (e.g., 1 and 1 or 1 and 0.8), a negative value is added (e.g., 0.8 and −0.1).

Reverse Paths

In some scenarios, a path in a learning tree may diverge (or "fork") into multiple possible sub-paths and one of the sub-paths (the "reverting sub-path") may revert back to another sub-path. Such a reversion may indicate that the reverting sub-path was sub-optimal for multiple users and that another sub-path is a portion of the learning path that should be recommended, even though more users (or even a majority of users who followed at least one of the two sub-paths) initially followed the reverting sub-path.

Thus, even though the largest plurality of users who consumed a particular learning resource followed a first sub-path (from the particular learning resource) over one or more other sub-paths (from the particular learning resource), the fact that users who followed the first sub-path is taken into account in generating a customized learning path for a user. For example, the number of users who followed the first sub-path and reverted to a second sub-path is considered in recommending the second sub-path over the first sub-path. For example, if the sum of (a) the number of users who selected the second sub-path over the first sub-path and (b) the number of users who selected the first sub-path and then reverted to the second sub-path is greater than (c) the number of users who selected the first sub-path and did not revert to the second sub-path (or to any other possible sub-path from the particular learning resource), then a learning path that includes the second sub-path is generated as a recommendation for a user.

Figure 3:
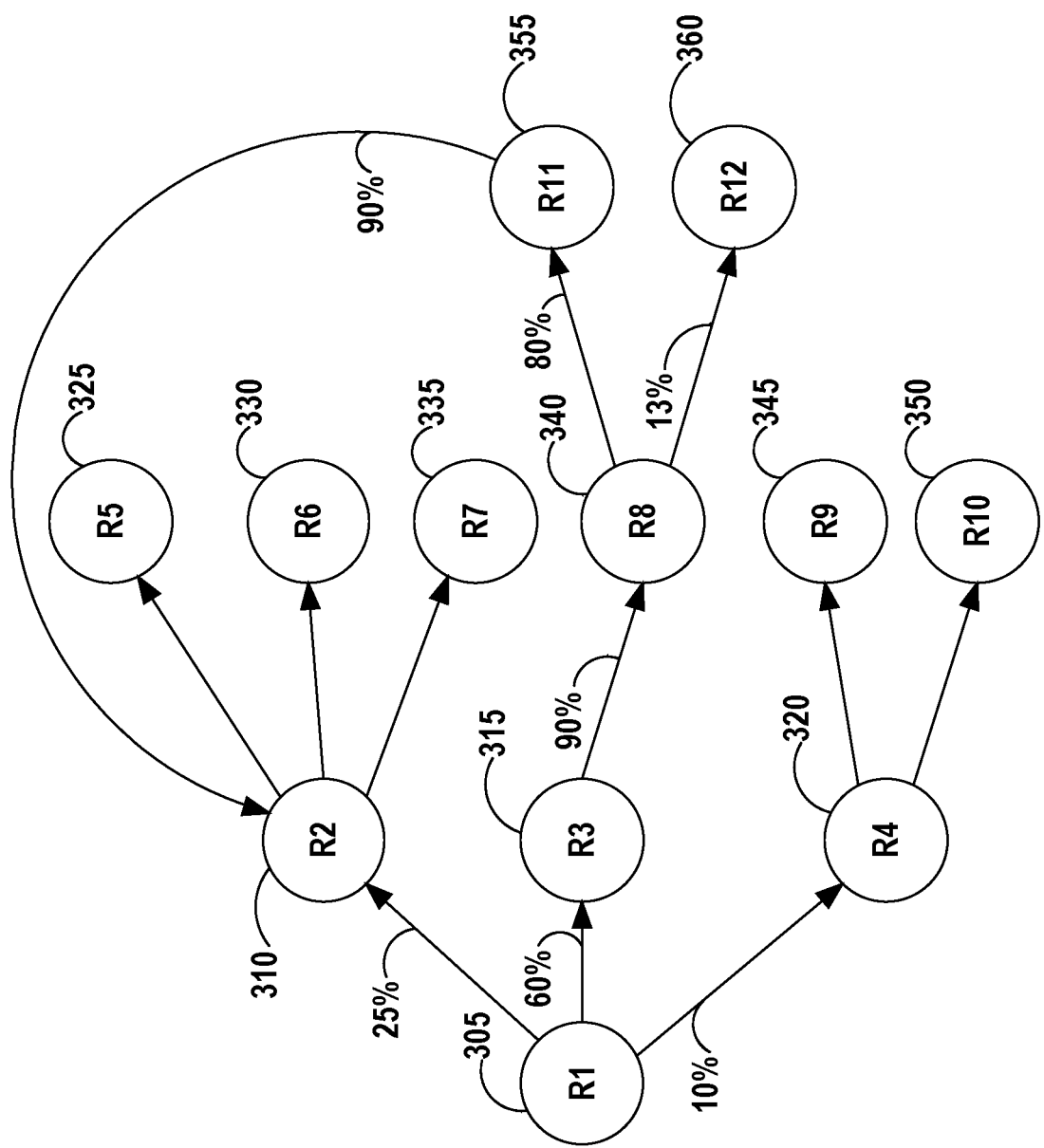
FIG. 3 is a block diagram that depicts an example learning tree with reverting paths, in an embodiment.

FIG. 3 is a block diagram that depicts an example learning tree 300 with reverting paths, in an embodiment. In this example, learning tree 300 includes a single root node: R1 305. This may be determined based on consumption of R1 by a particular user for which a customized learning tree is being generated. However, other example learning trees may have multiple root nodes. Also, while this block diagram depicts percentages, in other embodiments, a learning tree may be associated with whole numbers representing actual numbers of tuples that were generated. Also, actions regarding which portions of a learning tree to use in a customized learning path may be based directly on number of tuples instead of on percentages (which are based on the number of tuples).

R1 305 is connected to three learning resources: R2 310, R3 315, and R4 320. 25% of users that consumed R1 consumed R2 (e.g., immediately or without consuming any other learning resource) afterward, 60% of users that consumed R1 consumed R3 afterward, 10% of users that consumed R1 consumed R4 afterward, and 5% of users that consumed R1 either did not consume any learning resources after consuming R1 or consumed another learning resource (not depicted) after consuming R1.

R2 310 is also connected to three learning resources: R5 325, R6 330, and R7 335. Percentages of users that consumed each of R5-R7 are not depicted or described.

R3 315 is connected to one learning resource: R8 340. 90% of users that consumed R3 consumed R8 afterward. Although not depicted, some percentage of users that consumed R3 may have consumed one or more other learning resources after consuming R3. Also, some percentage of users that consumed R3 may have not have consumed any resources after consuming R3.

R4 320 is connected to two learning resources: R9 345 and R10 350. Percentages of users that consumed each of R9-R10 are not depicted or described.

R8 340 is connected to two learning resources: R11 355 and R12 360. 80% of users that consumed R8 consumed R11 afterward, 13% of users that consumed R8 consumed R12 afterward, and a certain percentage of users (e.g., 7%) that consumed R8 did not consume any learning resources after consuming R8.

In this example learning tree, if a greedy algorithm is used to generate a learning path for a user where the learning path begins at R1, then a learning path that may be presented is R1→R3→R8→R11. However, a significant percentage of users revert back to R2 after consuming R11. Specifically, about 65% of users that consume R3 after consuming R1 eventually consume R2. Such a reversion is taken into account when selecting which learning path within a learning tree is selected for presentation as a recommendation. In this example, 65% of 60% (i.e., the percentage that consumed R3 after consuming R1) is subtracted from 60% to yield ~21% for the edge connecting R1 and R3. Also, 65% of 60% is added to 25% (i.e., the percentage that consumed R2 after consuming R1) to yield ~64% for the edge connecting R1 and R2. Because the edge between R1 and R2 is associated with the highest percentage after taking into account reversion, a learning path with the (partial) path R1→R2 is selected for recommendation to a particular user. After further analysis of learning tree 300, the learning path is likely to include one of R5-R7 (presuming they are associated with the highest percentages after consuming R2) as the next learning resource in the eventual learning path.

Trimming a Learning Tree

Instead of indicating that a reverting sub-path was sub-optimal for multiple users, a reversion may indicate that there are other users who consumed a learning resource "in the middle" of the learning tree and then consumed learning resources "up" the learning tree or closer to root nodes of the learning tree. In fact, a learning tree may be initially full of loops, even among pairs of learning resources. In such a scenario, it is not clear which nodes are root nodes and which nodes are leaf nodes.

In an embodiment, directed edges (between nodes) that satisfy one or more edge removal criteria are removed prior to identifying a learning path for a user. An example edge removal criterion is based on a number of users that consumed one learning resource after consuming another learning resource. For example, if less than a threshold number of users consumed a second learning resource after consuming a first learning resource, then a directed edge from a node corresponding to the first learning resource to a node corresponding to the second learning resource is removed or deleted.

Another example edge removal criterion is based on when consumption of one of two learning resources in a tuple occurred. For example, if a majority of consumptions of a learning resource occurred prior to six months from the present time, then those consumptions are ignored or weighted lower than consumptions of the learning resource that occurred within the last six months. As another example, Another example edge removal criterion is based on how much time elapsed between consumption of two learning resources. For example, if the average or median amount of time between consuming two learning resources is greater than a particular threshold (e.g., ten days), then a directed edge connecting the two learning resources is removed.

In an embodiment, one or more edge removal criteria are only applied after one or more trigger criteria are satisfied. For example, after generating a learning tree, it may be difficult to select which learning resource indicated in the learning tree should be the beginning resource in a learning path, especially if a user for which the learning path is being generated has not consumed any learning resources indicated in the learning tree.

Repeated Consumption of the Same Learning Resource

Users may consume the same learning resource (or a portion thereof) multiple times. For example, multiple users may have the following viewing history: R1→R2→R3→R1→R4. Thus, something in R1 was so important that watching R1 a second time was useful for those users.

In an embodiment, when generating a customized learning path for a user (e.g., that is similar to other users), the fact that a learning resource was consumed multiple times to other users may be reflected in the customized learning path. For example, the learning path may refer to the same sequence above (i.e., R1→R2→R3→R1→R4). In a related example, the recommendation may indicate a certain portion of R1 for the user to consider, either for consuming twice or to pay extra attention to when consuming that certain portion the first time. That certain portion may be a portion that a threshold number (or percentage) of users watched twice (e.g., at least 20 (or 40% of) users consumed R1 a second time), such as between times 4:59 and 7:10 of a video, or pages 3, 11, and 18 of a document.

Example Visualization

A customized learning path may be displayed multiple ways. For example, a single customized learning path is depicted. Alternatively, multiple customized learning paths may be displayed simultaneously.

FIGS. 4A-4D are screenshots of an example user interface that depicts a learning tree 400 with a single root node and multiple overlapping learning paths that originate at the root node, in an embodiment. The user interface allows a user to conceptualize a recommended flow from one learning resource to the next. In this example, each edge has a unique opacity or lightness that correlates with a match probability. Such an effect suggests a learning path.

Figure 4A:
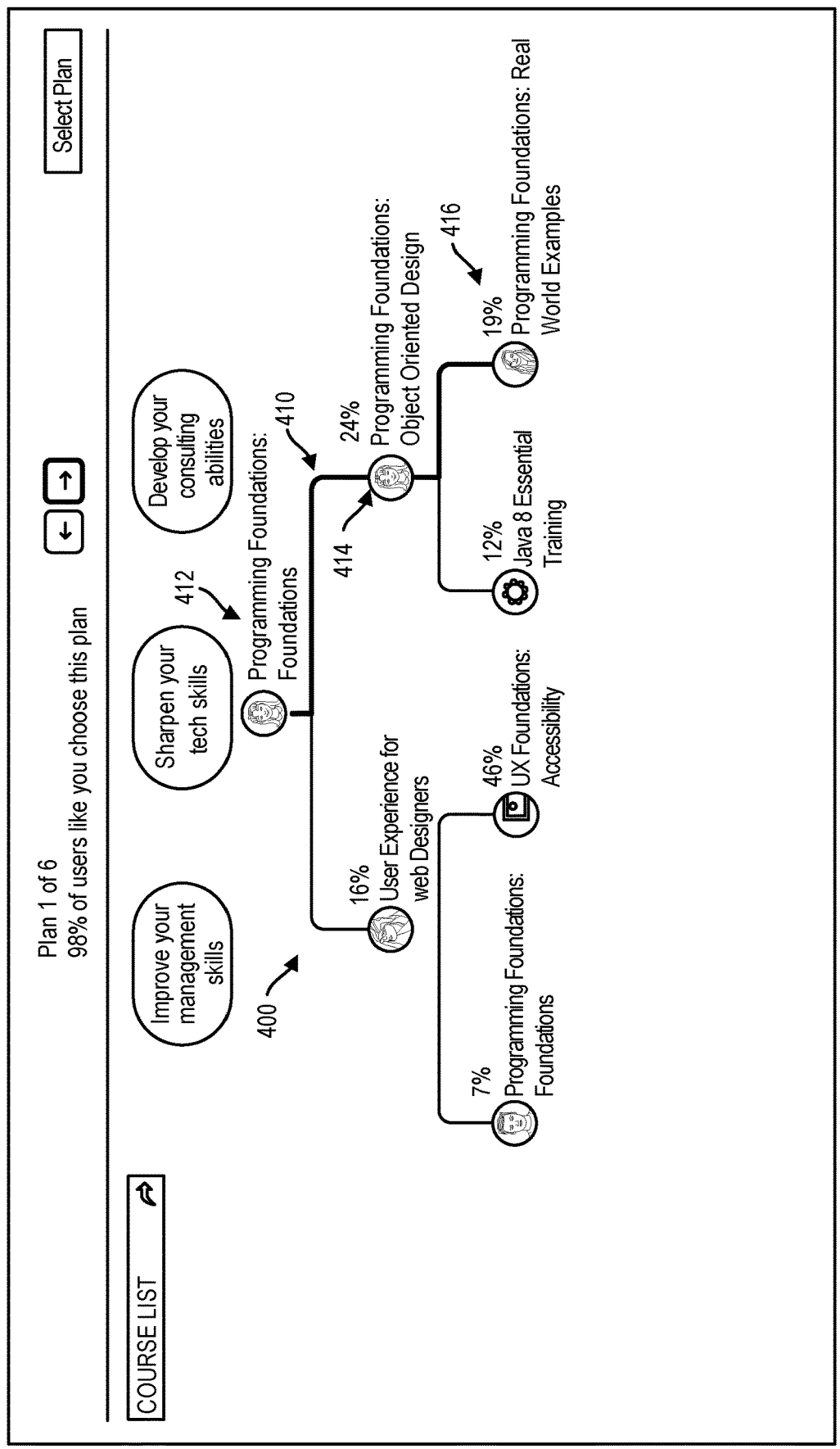
FIGS. 4A-4D are screenshots of an example user interface that depicts a learning tree with a single root node and multiple overlapping learning paths that originate at the root node, in an embodiment.

FIG. 4A is a screenshot that depicts learning tree 400 and a highlighted learning path 410 within learning tree 400. Learning path generator 136 may have generated learning tree 400. Learning path 410 comprises three learning resources: 412-416. Adjacent to each node in learning path 410, the user interface includes a title of the corresponding learning resource. Adjacent to each non-root node in learning path 410, the user interface includes a percentage that reflects a percentage of users the consumed the corresponding learning resource prior to consuming the prior learning resource in the learning path. For example, "24%" is adjacent to learning resource 414, which percentage indicates that 24% of users that consumed learning resource 412 then consumed learning resource 414. Similarly, "19%" is adjacent to learning resource 416, which percentage indicates that 19% of users that consumed learning resource 414 then consumed learning resource 416.

Learning path 410 may be highlighted initially indicating that learning path generator 136 automatically selected that path over other possible paths in learning tree 400. Such an automatic selection may indicate that each pair of learning resources in learning path 410 has been traversed more than the other corresponding alternative resource pairs in learning tree 400.

Figure 4B:
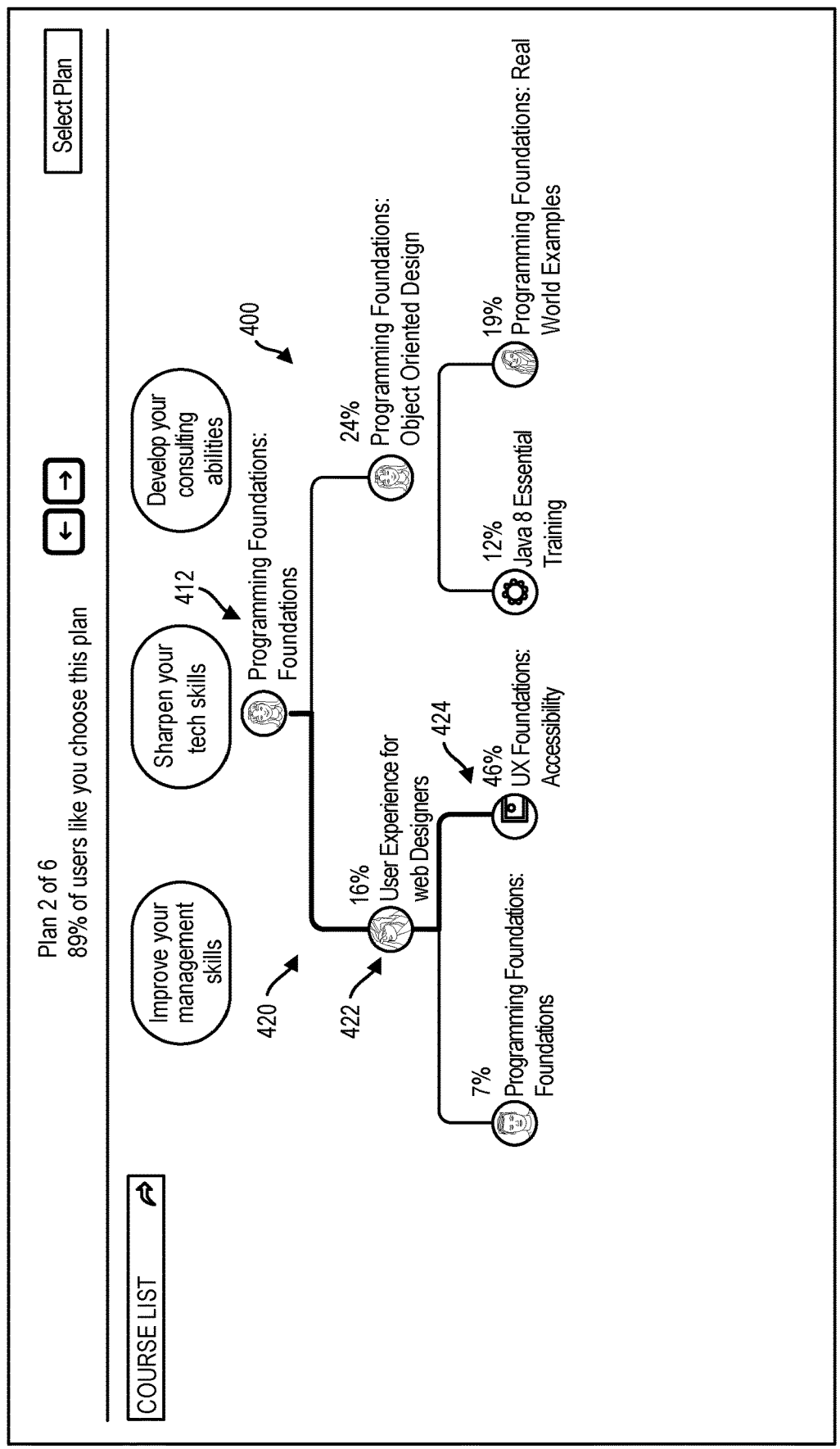

FIG. 4B is a screenshot that depicts learning tree 400 and a highlighted learning path 420. Learning path 420 comprises three learning resources: 412, 422, and 424. Thus, learning paths 410 and 420 share the same root node (412). Again, adjacent to each node in learning path 420, the user interface includes a title of the corresponding learning resource. Adjacent to each non-root node in learning path 420, the user interface includes a percentage that reflects a percentage of users the consumed the corresponding learning resource prior to consuming the prior learning resource in the learning path. For example, "16%" is adjacent to learning resource 422, which percentage indicates that 16% of users that consumed learning resource 412 then consumed learning resource 422. Similarly, "46%" is adjacent to learning resource 424, which percentage indicates that 46% of users that consumed learning resource 422 then consumed learning resource 424.

Figure 4C:
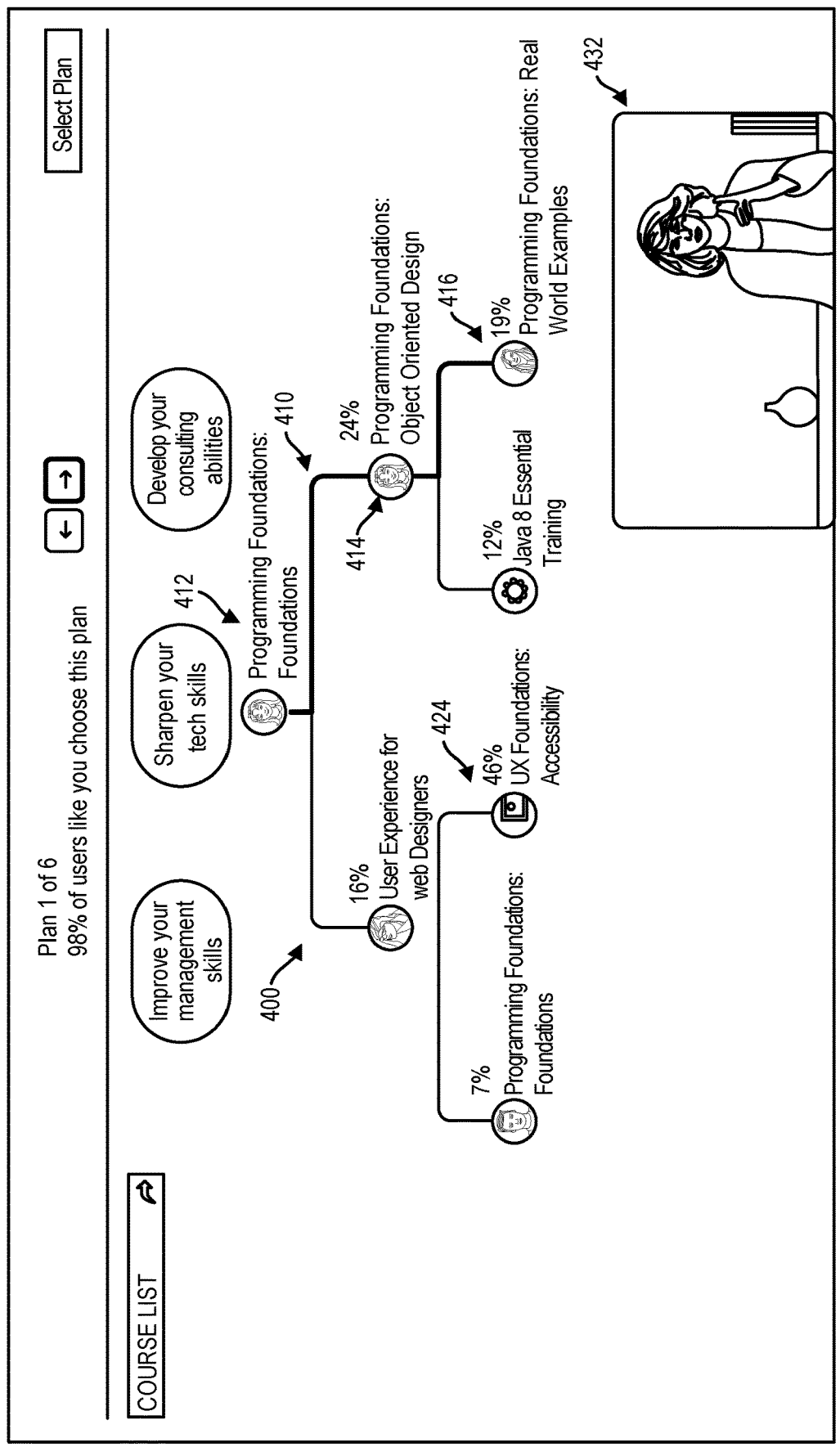

FIG. 4C is similar to FIG. 4A, except that a cursor hovers over learning resource 414. In an embodiment, user selection (e.g., using a finger on a touchscreen, selecting a button on a cursor device, or just hovering a cursor over) a node in the learning tree (corresponding to a particular learning resource) causes additional information about the learning resource to be displayed, such as a title, a description, an image of the learning resource. In this example, image 432, which comes from learning resource 414 is displayed in response to user input or cursor hovering. Image 432 includes a portion of the corresponding video and text that is associated with that portion of the video. In a related embodiment, image 432 is displayed through a video player and selection of image 432 causes a portion of the corresponding video to be played through the video play. Alternatively, selecting image 432 causes the video player to be launched. Whatever is played through the video player may be a complimentary portion of the video, in order to entice the viewer to accept the corresponding learning path.

Figure 4D:
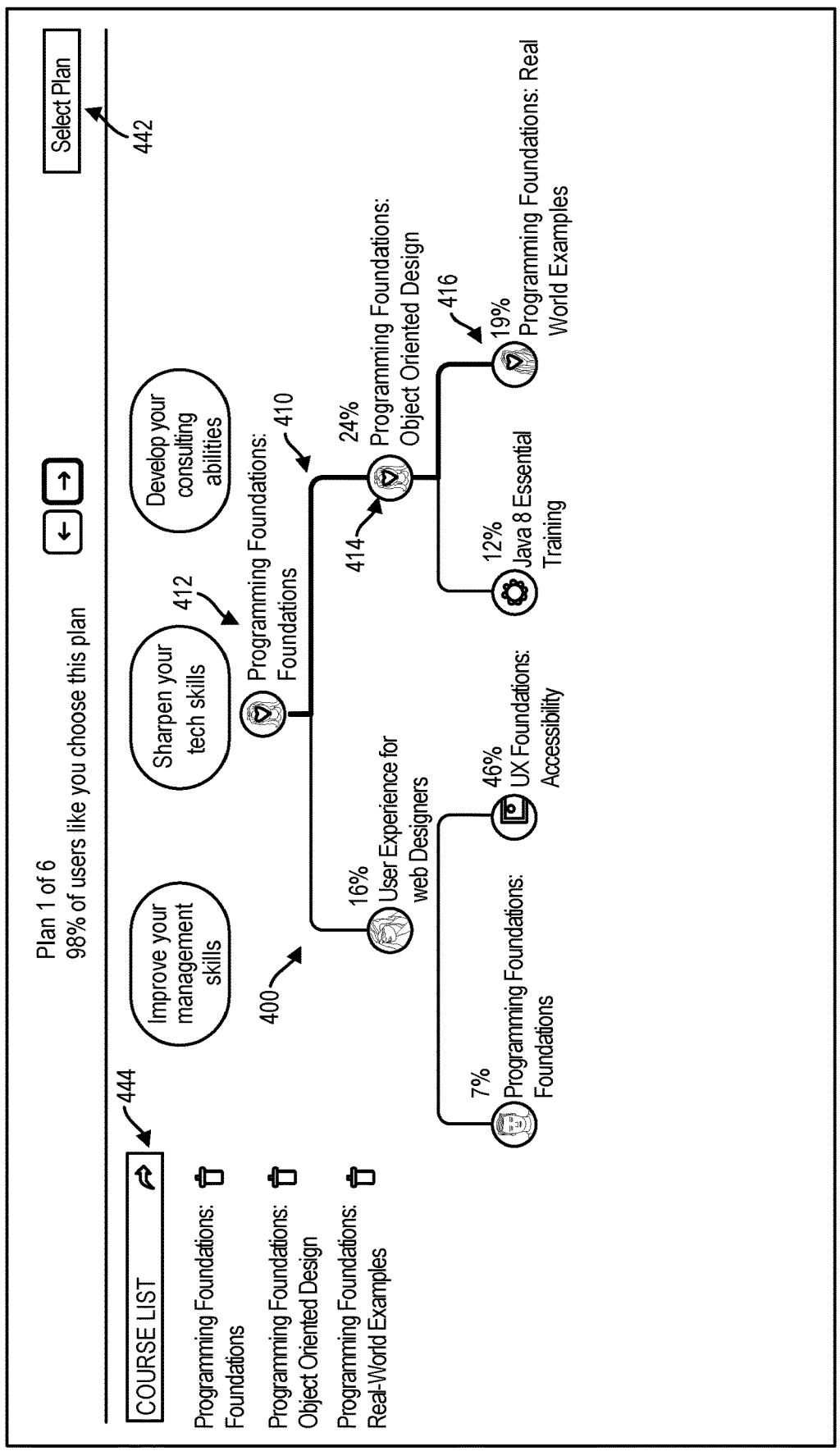

FIG. 4D is a screenshot that depicts learning tree 400 after learning path 410 has been selected by a user. In this example, a learning path is selected when a user selects the "Select Plan" button 442 while the learning path is highlighted. Further, user selection of a learning path causes an icon (in this example, a heart icon) to be displayed over each image representing a learning resource in the learning path. Also, the titles of the learning resources in the selected learning path are added to a "Course List" listing 444. In this example, because there are three learning resources in learning path 410 and a user selected learning path 410, the title of each of the three learning paths is added to listing 444. The order of the titles in listing 444 is the same as the order of the learning resources in learning path 410. This listing may be persistent across user sessions with server system 130. Thus, if the user logs off server system 130 (e.g., using client 112) and later logs back on, the user will still be able to view listing 444.

In an embodiment, if a user consumes a learning resource that is listing in the user's resource listing (e.g., listing 444), then the resource listing is updated to indicate that the learning resource has been consumed. For example, the title of the consumed learning resource may be removed from the resource listing entirely. As another example, the title may have a strikethrough, may be darkened, or may have other font- or graphic-related effects applied thereto to differentiate from other learning resources that the user has not yet consumed.

Tracking Consumption at the Sub-Resource Level

Embodiments described herein associate two learning resources together if one learning resource was consumed after the other learning resource. However, some learning resources may be not be consumed fully. In fact, many users may consume a particular learning resource after consuming a particular portion of another learning resource. For example, after watching the fifth minute of a ten-minute video, 30% of users consume R2. If a 80% consumption threshold is used to determine whether a user consumed a resource, then a link (or association) between the ten-minute video and R2 would never be discovered.

In an embodiment, a resource consumption record associates (a) a segment of a learning resource with another learning resource or (b) a segment of one learning resource with a segment of another learning resource. A segment of a learning resource may correspond to one of multiple types of portions of the learning resource, depending on the type of learning resource. For example, videos, audio files, and books may be divided into chapters. A textual document may be divided into pages or headings and, optionally, subheadings. A segment within a learning resource may be defined based on metadata that accompanies a learning resource (e.g., a chapter) or may be determined based on analysis of the learning resource, such as headings in a textual document or in a transcript of a video, or significant pauses (or periods of relative silence) detected in an audio file or a video.

In an embodiment, a learning path may indicate that a certain portion or segment of a learning resource is recommended before consuming a subsequent learning resource in the learning path.

In an embodiment, a learning path may be generated as described herein and any segment-level analysis is performed afterward. For example, a learning path may be generated without taking into account (e.g., relatively high) level of completion. Then, segment-level analysis may be performed on each learning resource in the learning path. For example, only 5% consumption of a learning resource may be required in order to count the learning resource as being consumed. Thus, if many users only consume between 5% and 10% of a learning resource, then multiple tuples may be generated based on those users' consumption of that learning resource. Then, analysis of segment-level statistics of that learning resource may be performed to detect where a majority (or the largest plurality) of users began consuming the learning resource, ended consuming the learning resource, or both, including segments or portions that were skipped. If 45% of users that consumed the learning resource ended at chapter 5 and 37% of users that consumed the learning resource ended at chapter 7, then chapter 5 may be recommended, in a suggested learning path for a user, as an ending point for that learning resource.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
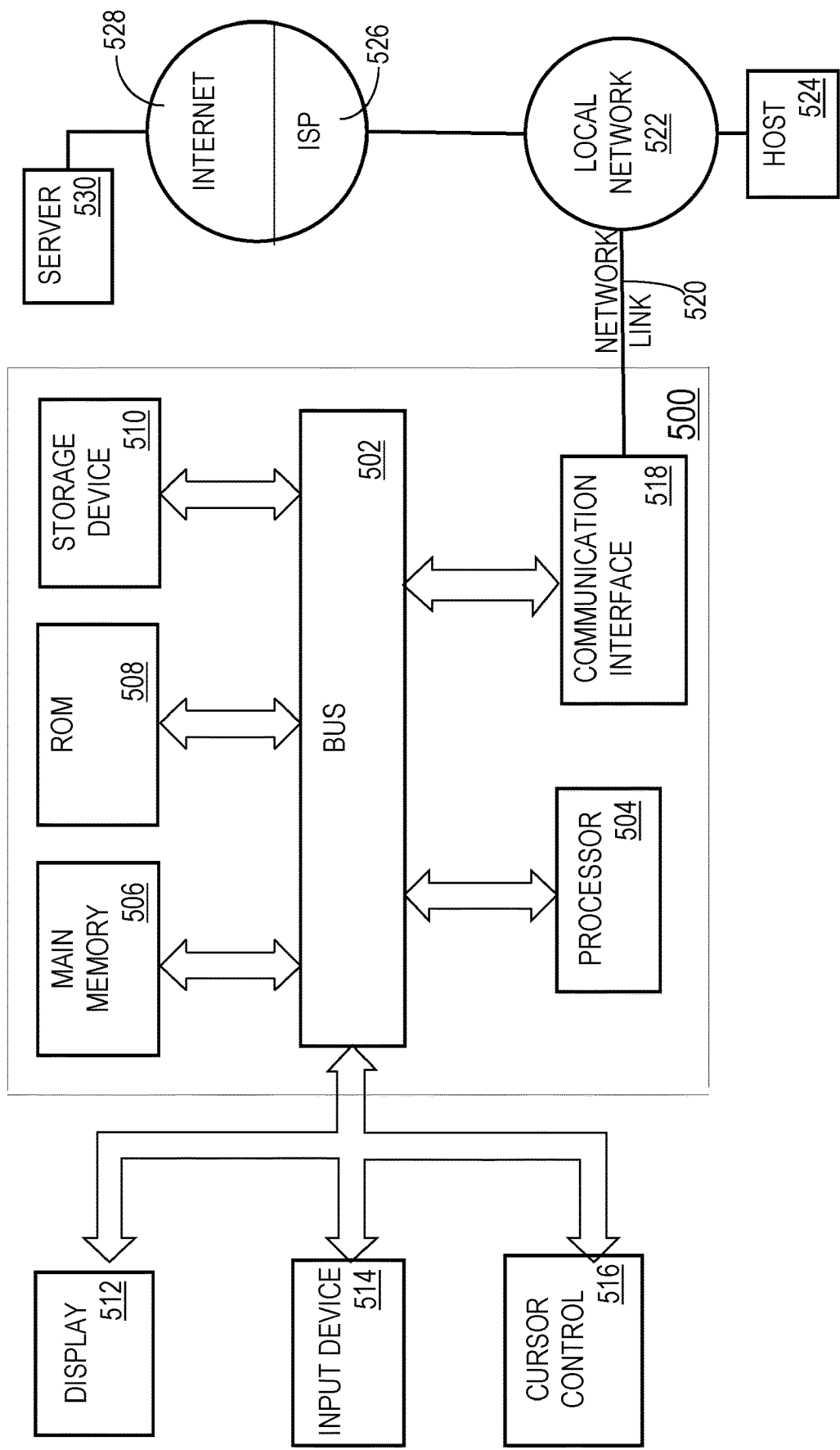
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for generating, by a computer system, customized learning paths, the method comprising:
    storing, by the computer system, a database of electronic learning resources;
    receiving, over a computer network, a plurality of client requests from a plurality of client devices operated by a plurality of users;
    for each client request in the plurality of client requests:
        retrieving, by the computer system, a first learning resource from the database;
        storing, by the computer system, the first learning resource in volatile memory of the computer system; and
        transmitting, by the computer system, over the computer network, the first learning resource to the client device that transmitted said each client request;
    recording consumption data that indicates consumption of a plurality of learning resources, stored in the databased database, by the plurality of users;
    wherein recording the consumption data comprises, for each client request of the plurality of client requests, recording, by a resource consumption tracker of the computer system, in an electronic consumption record, an identity of a certain user that initiated said each client request, an identity of a second learning resource that the certain user consumed, and a timestamp that indicates a date or time that the second learning resource was consumed by the certain user;
    based on the consumption data, generating, by the computer system, a plurality of learning resource tuples, each learning resource tuple indicating that one learning resource that was consumed by a user prior to another learning resource that was consumed by the user;

wherein generating the plurality of learning resource tuples comprises, for each user of the plurality of users:
identifying, by the computer system, one or more electronic consumption records in the consumption data that are associated with said each user;
based on the timestamp in each of the one or more electronic consumption records, generating an order of the learning resources indicated in the one or more electronic consumption records;
generating one or more learning resource tuples based on the order;
performing a plurality of aggregations, wherein each aggregation in the plurality of aggregations involves aggregating different sets of learning resource tuples in the plurality of learning resource tuples, wherein each set of learning resource tuples comprises the same two learning resources in the same order;
based on a subset of the plurality of aggregations, generating, for a first user that is not included in the plurality of users, a first customized learning path that comprises a first set of learning resources;
transmitting the first customized learning path over the computer network to a computing device of the first user;
wherein the method is performed by one or more computing devices.

2. The method of claim 1, further comprising:
generating, for the first user, a second customized learning path that comprises a second set of learning resources that is different than the first set of learning resources;
causing the first and second customized learning paths to be displayed concurrently to the first user.

3. The method of claim 1, further comprising:
determining a group of users that are similar to the first user;
for each user in the group of users, identifying a set of learning resources that was consumed by said each user;
wherein the plurality of aggregations is based on the sets of learning resources consumed, respectively, by each user in the group of users.

4. The method of claim 3, further comprising:
identifying one or more attribute values associated with the first user, wherein determining the group of users comprises determining that each user in the group of users is associated with the one or more attribute values;
wherein the one or more attribute values indicate a particular industry, a particular job title, a particular level of experience, or a particular geographic region.

5. The method of claim 4, wherein:
identifying the one or more attribute values comprises identifying a first profile associated with the first user, wherein the first profile includes data that the first user inserted into the first profile;
determining that each user in the group of users is associated with the one or more attribute values comprises identifying, for each user in the group of users, a second profile that is associated with the said each user and includes data that said each user inserted into the second profile.

6. The method of claim 4, wherein the one or more attribute values are a plurality of attribute values that indicate two or more of the particular industry, the particular job title, the particular level of experience, or the particular geographic region.

7. The method of claim 1, further comprising:
determining that a particular user consumed a first particular learning resource prior to a second particular learning resource;
generating a first learning resource pair that identifies the first particular learning resource and the second particular learning resource;
performing a first aggregation that aggregates the first learning resource pair with one or more other first learning resource pairs;
wherein the first customized learning path is generated based on the first aggregation;
performing a second aggregation that aggregates the first learning resource pair with one or more other second learning resource pairs;
based on the second aggregation, generating a second customized learning path for a second user that is different than the first user.

8. The method of claim 1, further comprising:
determining that a particular user consumed a first particular learning resource prior to a second particular learning resource;
determining whether the particular user consumed a particular amount of the first particular learning resource, wherein the particular amount is less than the entirety of the first particular learning resource;
generating a learning resource pair for the first particular learning resource and the second particular learning resource only in response to determining that the particular amount is greater than a particular threshold.

9. The method of claim 1, further comprising:
identifying one or more learning resources that the first user has already consumed;
wherein generating the first customized learning path is also based on the one or more learning resources.

10. A method for generating customized learning paths, the method comprising:
recording consumption data that indicates consumption of a plurality of learning resources by a plurality of users;
based on the consumption data, generating a plurality of learning resource tuples, each learning resource tuple indicating that one learning resource that was consumed by a user prior to another learning resource that was consumed by the user;
performing a plurality of aggregations, wherein each aggregation in the plurality of aggregations involves aggregating different sets of learning resource tuples in the plurality of learning resource tuples, wherein each set of learning resource tuples comprises the same two learning resources in the same order;
based on a subset of the plurality of aggregations, generating, for a first user, a first customized learning path that comprises a first set of learning resources;
causing the first customized learning path to be displayed to the first user;
determining that a first number of users consumed a second particular learning resource after consuming a first particular learning resource;
determining that a second number of users consumed a third particular learning resource after consuming the first particular learning resource;
based on the first number being greater than the second number, including the second particular learning resource in the first customized learning path instead of the third particular learning resource;
wherein the method is performed by one or more computing devices.

11. One or more non-transitory storage media storing instructions for generating customized learning paths, wherein the instructions, when executed by one or more processors, cause:
   storing, by a computer system, a database of electronic learning resources;
   receiving, over a computer network, a plurality of client requests from a plurality of client devices operated by a plurality of users;
   for each client request in the plurality of client requests:
      retrieving, by the computer system, a first learning resource from the database;
      storing, by the computer system, the first learning resource in volatile memory of the computer system; and
      transmitting, by the computer system, over the computer network, the first learning resource to the client device that transmitted said each client request;
   recording consumption data that indicates consumption of a plurality of learning resources, stored in the databased database, by the plurality of users;
   wherein recording the consumption data comprises, for each client request of the plurality of client requests, recording, by a resource consumption tracker of the computer system, in an electronic consumption record, an identity of a certain user that initiated said each client request, an identity of a second learning resource that the certain user consumed, and a timestamp that indicates a date or time that the second learning resource was consumed by the certain user;
   based on the consumption data, generating, by the computer system, a plurality of learning resource tuples, each learning resource tuple indicating that one learning resource that was consumed by a user prior to another learning resource that was consumed by the user;
   wherein generating the plurality of learning resource tuples comprises, for each user of the plurality of users:
      identifying, by the computer system, one or more electronic consumption records in the consumption data that are associated with said each user;
      based on the timestamp in each of the one or more electronic consumption records, generating an order of the learning resources indicated in the one or more electronic consumption records;
      generating one or more learning resource tuples based on the order;
   performing a plurality of aggregations, wherein each aggregation in the plurality of aggregations involves aggregating different sets of learning resource tuples in the plurality of learning resource tuples, wherein each set of learning resource tuples comprises the same two learning resources in the same order;
   based on a subset of the plurality of aggregations, generating, for a first user that is not included in the plurality of users, a first customized learning path that comprises a first set of learning resources;
   transmitting the first customized learning path over the computer network to a computing device of the first user.

12. The one or more non-transitory storage media of claim 11, wherein the instructions, when executed by the one or more processors, further cause:
   generating, for the first user, a second customized learning path that comprises a second set of learning resources that is different than the first set of learning resources;
   causing the first and second customized learning paths to be displayed concurrently to the first user.

13. The one or more non-transitory storage media of claim 11, wherein the instructions, when executed by the one or more processors, further cause:
   determining a group of users that are similar to the first user;
   for each user in the group of users, identifying a set of learning resources that was consumed by said each user;
   wherein the plurality of aggregations is based on the sets of learning resources consumed, respectively, by each user in the group of users.

14. The one or more non-transitory storage media of claim 13, wherein the instructions, when executed by the one or more processors, further cause:
   identifying one or more attribute values associated with the first user, wherein determining the group of users comprises determining that each user in the group of users is associated with the one or more attribute values;
   wherein the one or more attribute values indicate a particular industry, a particular job title, a particular level of experience, or a particular geographic region.

15. The one or more non-transitory storage media of claim 14, wherein:
   identifying the one or more attribute values comprises identifying a first profile associated with the first user, wherein the first profile includes data that the first user inserted into the first profile;
   determining that each user in the group of users is associated with the one or more attribute values comprises identifying, for each user in the group of users, a second profile that is associated with the said each user and includes data that said each user inserted into the second profile.

16. The one or more non-transitory storage media of claim 14, wherein the one or more attribute values are a plurality of attribute values that indicate two or more of the particular industry, the particular job title, the particular level of experience, or the particular geographic region.

17. The one or more non-transitory storage media of claim 11, wherein the instructions, when executed by the one or more processors, further cause:
   determining that a particular user consumed a first particular learning resource prior to a second particular learning resource;
   generating a first learning resource pair that identifies the first particular learning resource and the second particular learning resource;
   performing a first aggregation that aggregates the first learning resource pair with one or more other first learning resource pairs;
   wherein the first customized learning path is generated based on the first aggregation;
   performing a second aggregation that aggregates the first learning resource pair with one or more other second learning resource pairs;
   based on the second aggregation, generating a second customized learning path for a second user that is different than the first user.

18. The one or more non-transitory storage media of claim 11, wherein the instructions, when executed by the one or more processors, further cause:
   determining that a particular user consumed a first particular learning resource prior to a second particular learning resource;

determining whether the particular user consumed a particular amount of the first particular learning resource, wherein the particular amount is less than the entirety of the first particular learning resource;

generating a learning resource pair for the first particular learning resource and the second particular learning resource only in response to determining that the particular amount is greater than a particular threshold.

19. The one or more non-transitory storage media of claim 11, wherein the instructions, when executed by the one or more processors, further cause:

determining that a first number of users consumed a second particular learning resource after consuming a first particular learning resource;

determining that a second number of users consumed a third particular learning resource after consuming the first particular learning resource;

based on the first number being greater than the second number, including the second particular learning resource in the first customized learning path instead of the third particular learning resource.

20. The one or more non-transitory storage media of claim 11, wherein the instructions, when executed by the one or more processors, further cause:

identifying one or more learning resources that the first user has already consumed;

wherein generating the first customized learning path is also based on the one or more learning resources.

* * * * *